US008191959B2

(12) United States Patent
Ritz

(10) Patent No.: US 8,191,959 B2
(45) Date of Patent: Jun. 5, 2012

(54) FRONT END MODULE FOR A MOTOR VEHICLE

(75) Inventor: Thomas Ritz, Nufringen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 224 days.

(21) Appl. No.: 12/701,726

(22) Filed: Feb. 8, 2010

(65) Prior Publication Data
US 2010/0213742 A1 Aug. 26, 2010

(30) Foreign Application Priority Data

Feb. 20, 2009 (DE) .......................... 10 2009 009 882

(51) Int. Cl.
B62D 25/08 (2006.01)
(52) U.S. Cl. ............................ 296/187.09; 296/193.09
(58) Field of Classification Search ............ 296/187.03, 296/187.09, 193.09, 193.1, 203.02; 293/102, 293/115, 120, 132, 133; 180/68.1, 68.4
See application file for complete search history.

(56) References Cited

U.S. PATENT DOCUMENTS

| | | | |
|---|---|---|---|
| 5,533,780 A * | 7/1996 | Larson et al. ............ 296/203.02 |
| 5,573,299 A * | 11/1996 | Masuda .................. 296/193.09 |
| 5,575,526 A * | 11/1996 | Wycech .......................... 296/205 |
| 5,865,500 A * | 2/1999 | Sanada et al. .............. 296/193.1 |
| 5,915,490 A * | 6/1999 | Wurfel .......................... 180/68.1 |
| 6,386,624 B1 | 5/2002 | Schultz et al. |
| 6,450,276 B1 | 9/2002 | Latcau |
| 6,502,874 B2 * | 1/2003 | Kajiwara et al. .............. 293/133 |
| 6,540,284 B2 * | 4/2003 | Miyata .................... 296/203.02 |
| 6,634,702 B1 | 10/2003 | Pleschke et al. |
| 6,672,652 B2 * | 1/2004 | Takeuchi et al. ......... 296/193.09 |
| 6,796,604 B2 * | 9/2004 | Igura et al. ............... 296/193.03 |
| 6,869,131 B2 * | 3/2005 | Kafuku et al. ........... 296/187.09 |
| 7,255,377 B2 * | 8/2007 | Ahn .............................. 293/102 |
| 7,419,208 B2 * | 9/2008 | Sub ........................ 296/193.09 |
| 7,963,355 B2 * | 6/2011 | Mishima ...................... 180/68.4 |
| 2002/0063433 A1 | 5/2002 | Gotanda et al. |
| 2008/0308333 A1 | 12/2008 | Kapadia et al. |
| 2009/0212600 A1 | 8/2009 | Fischer et al. |

FOREIGN PATENT DOCUMENTS

| | | |
|---|---|---|
| DE | 10002499 A1 | 3/2001 |
| DE | 60024933 T2 | 8/2006 |
| DE | 102005055705 A1 | 5/2007 |
| DE | 102006047419 A1 | 4/2008 |

* cited by examiner

Primary Examiner — H Gutman

(57) ABSTRACT

A front end module for a motor vehicle substantially contains a downwardly open assembly support which is connected to a crash cross-member via lateral connecting limbs, and the two components form a rectangular, closed frame. A further, lower crash cross-member which likewise forms a rectangularly closed frame is connected to the crash cross-member.

8 Claims, 7 Drawing Sheets

FRONT END MODULE FOR A MOTOR VEHICLE

CROSS-REFERENCE TO RELATED APPLICATION

This application claims the priority, under 35 U.S.C. §119, of German application DE 10 2009 009 882.8, filed Feb. 20, 2009; the prior application is herewith incorporated by reference in its entirety.

BACKGROUND OF THE INVENTION

Field of the Invention

The invention relates to a front end module for a motor vehicle which is connected to a vehicle body and contains an assembly support arranged above longitudinal members of the vehicle, and an upper crash cross-member which is connected to the longitudinal members.

Published, non-prosecuted German patent application DE 10 2006 047 419 A1 discloses a support part for a front end module of a motor vehicle, the support part being fastenable to the bodywork of a vehicle and contains a transverse element which is arranged in a horizontal plane, is held on a cross-member and is connected to a lower, ending transverse element via vertically arranged connecting elements. Furthermore, German Utility Model DE 600 24 933 T2 discloses a unit for a front end of a motor vehicle. The unit contains an upper part with lateral receptacles for headlights and a central receptacle for a radiator, and a lower part, to which a transversely oriented structural shock absorber is fastened, is connected to the upper part.

SUMMARY OF THE INVENTION

It is accordingly an object of the invention to provide a front end module for a motor vehicle which overcomes the above-mentioned disadvantages of the prior art devices of this general type, which is assembled in a simple manner from individual parts and is integrable into the vehicle body in such a manner that a stable constructional unit is formed in connection with the front structural section of the vehicle body.

With the foregoing and other objects in view there is provided, in accordance with the invention a front end module for a motor vehicle and connected to a vehicle body. The front end module contains an assembly support disposed above longitudinal members of the vehicle body and having connecting limbs; fasteners; and an upper crash cross-member connected to the longitudinal members. The assembly support is connected to the upper crash cross-member and forms a rectangular closed frame, and for connection to the assembly support, the upper crash cross-member has vertically aligned bulkhead plates disposed in each case on an end side, and are connected to the connecting limbs of the assembly support via the fasteners. The connecting limbs together with the bulkhead plates form lateral frame sections. A lower crash cross-member is fastened at a distance to lower, free ends of the bulkhead plates of the upper crash cross-member, and the upper and lower crash cross-members form a further, rectangularly closed frame.

The advantages primarily obtained with the invention are that, by a lateral connection of a downwardly open assembly support to an upper crash cross-member and to a lower crash cross-member, at least one peripherally closed frame is produced. The frame for connection to the assembly support, is provided by the crash cross-member containing vertically oriented bulkhead plates which are arranged in each case on the end sides, are connected to connecting limbs of the assembly support, which connecting limbs correspond to the bulkhead plates, via fasteners and form lateral frame sections. A lower crash cross-member is fastened at a distance to lower, free ends of the bulkhead plates of the upper crash cross-member, and the two crash cross-members form a further, rectangularly closed frame. By this configuration of a front end module and of the securing to longitudinal members of the vehicle and to structural elements of the vehicle body, overall the stable front region of the bodywork of the vehicle is provided.

The assembly support according to the invention is preferably configured as a "hybrid component" and contains a steel upper chord which is encapsulated by a plastic by injection molding, and the connecting limbs are composed of a plastics material. Charge air coolers which are arranged between the lateral frame sections and a horizontal support part which is lead out via the connecting limb are connected to the assembly support, the charge air cooler being held on the bulkhead plate of the upper crash cross-member and on the support part. The charge air coolers are preferably arranged in mountings on the bulkhead plates of the crash cross-member.

The upper crash cross-member has a respective crash box between it and the bulkhead plates. The crash boxes are arranged as an extension of the longitudinal members of the vehicle and are supported virtually on the end sides of the longitudinal members via the bulkhead plates.

The lower crash cross-member, at the free ends thereof, has a respective plate-like foot with an inner ribbing and is fixed in the bulkhead plate via a guide pin and is fastenable to the bulkhead plate by at least one fastening screw. For reinforcement purposes, the crash cross-member has a ribbed insert, preferably made of plastic or of a different material.

A supporting frame is arranged on the front side of the assembly support and, between the supporting frame and the assembly support. A vertically oriented lock strut is fastened to the assembly support. The lock strut is provided in the longitudinal center plane of the vehicle and being connected by a lower, free end to the upper crash cross-member. The front fairing is fastenable to the supporting frame.

All in all, the crash cross-member ends which are laterally connected to the downwardly open assembly support, and the associated lock strut provide at least one stable frame, wherein components which are already present in the vehicle are taken over for the function of the closed frame, and a doubling of material, as in the case of an embodiment with an assembly support which is closed at the outset, is avoided.

Other features which are considered as characteristic for the invention are set forth in the appended claims.

Although the invention is illustrated and described herein as embodied in a front end module for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
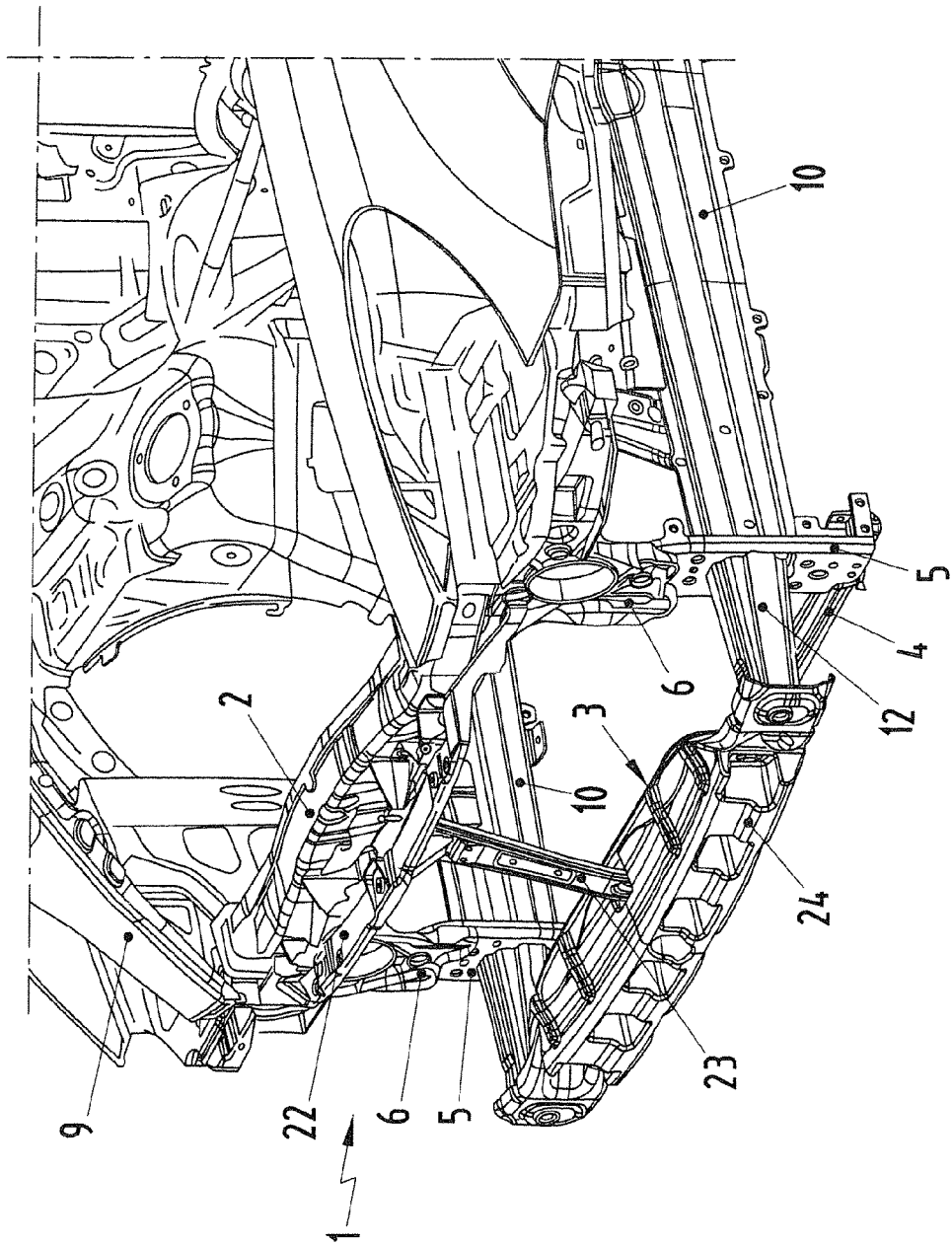
FIG. 1 is a diagrammatic, perspective view of a front end module with an assembly support, upper and lower crash cross members and a lock strut according to the invention.
Figure 2:
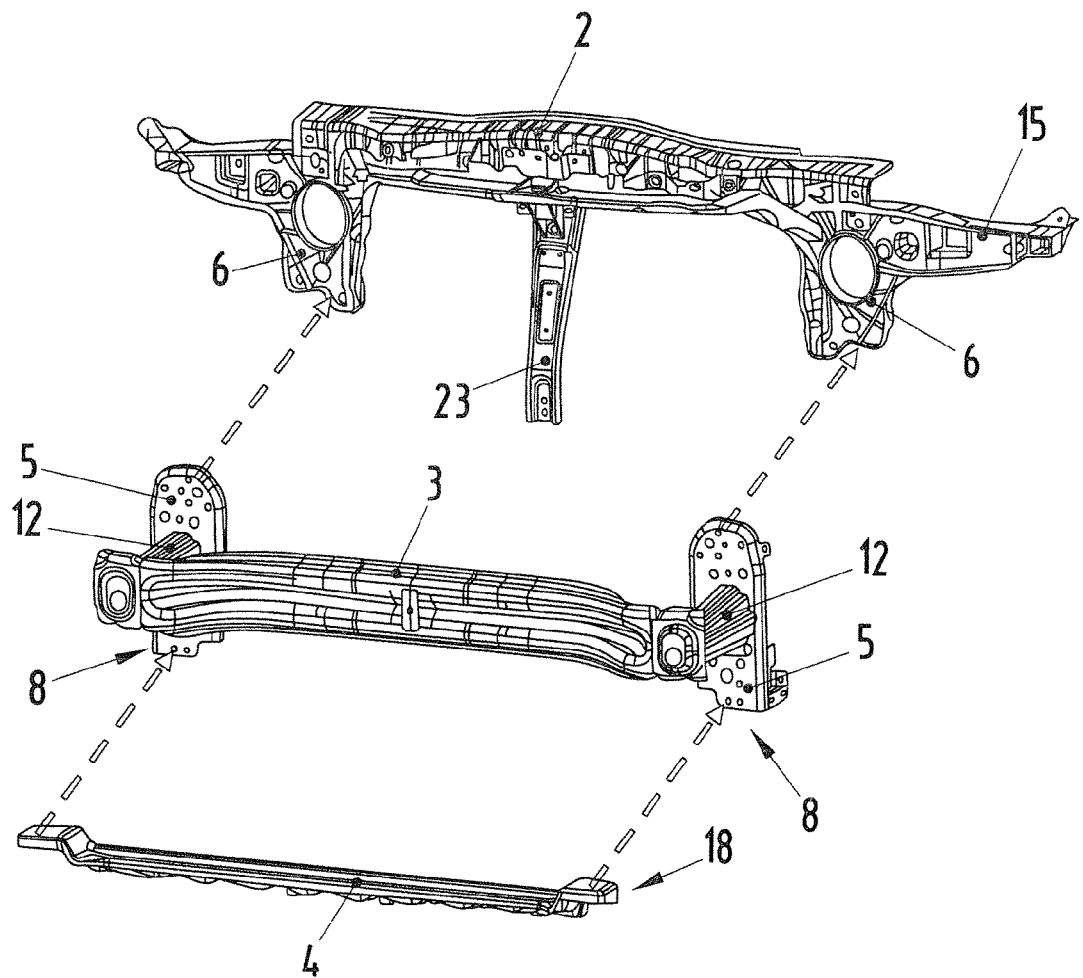
FIG. 2 is an exploded, perspective view of individual non-assembled structural elements of the front end module.

Referring now to the figures of the drawing in detail and first, particularly, to FIG. 1 thereof, there is shown a front end module 1 for a motor vehicle substantially containing a downwardly open assembly support 2 and a first, upper crash cross-member 3 and a second, lower crash cross-member 4. The assembly support 2 is laterally connected to the first, upper crash cross-member 4 via a fastening of bulkhead plates 5 of the crash cross-member to connecting limbs 6 of the assembly support 2. The further, lower crash cross-member 4 is connected to lower, free ends 8 of the bulkhead plates 5 of the upper crash cross-member 4.

The assembly support 2 together with the upper crash cross-member 3 and the lower crash cross-member 4 forms a rectangular frame R and R1 which is closed all the way around, wherein the connecting limbs 6 together with the bulkhead plates 5 form lateral frame sections 11.

The assembly support 2 is connected to a body structure 9 of the vehicle above longitudinal members 10 of the vehicle, wherein the upper crash cross-member 4 is connected directly to the longitudinal members 10 of the vehicle via the bulkhead plates 5.

The upper crash cross-member 3 has crash boxes 12 between the bulkhead plates 5 and the free ends of the crash cross member 3, the crash boxes 12 being arranged as an extension of the longitudinal members 10 of the vehicle and the end sides of the longitudinal members 10 each being opposite the end sides of the crash boxes 12.

Figure 9:
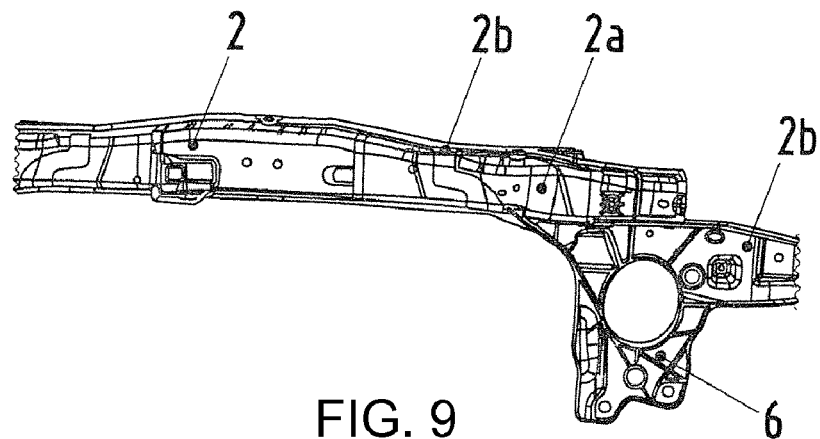
FIG. 9 is a front view of the assembly support as a hybrid component.
Figure 10:
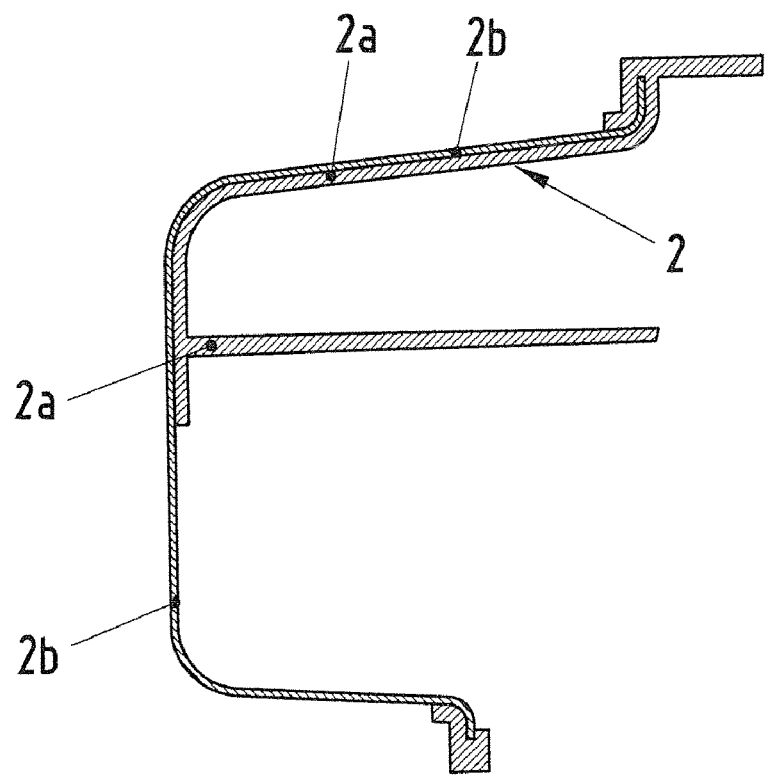
FIG. 10 is a cross sectional view through the assembly support according to FIG. 8.

The assembly support 2 can be configured as a "hybrid component" (FIGS. 9 and 10), wherein a steel upper chord 2a is encapsulated by a one plastic 2b by injection molding, and furthermore the connecting limbs 6 can be composed of plastic.

Figure 5:
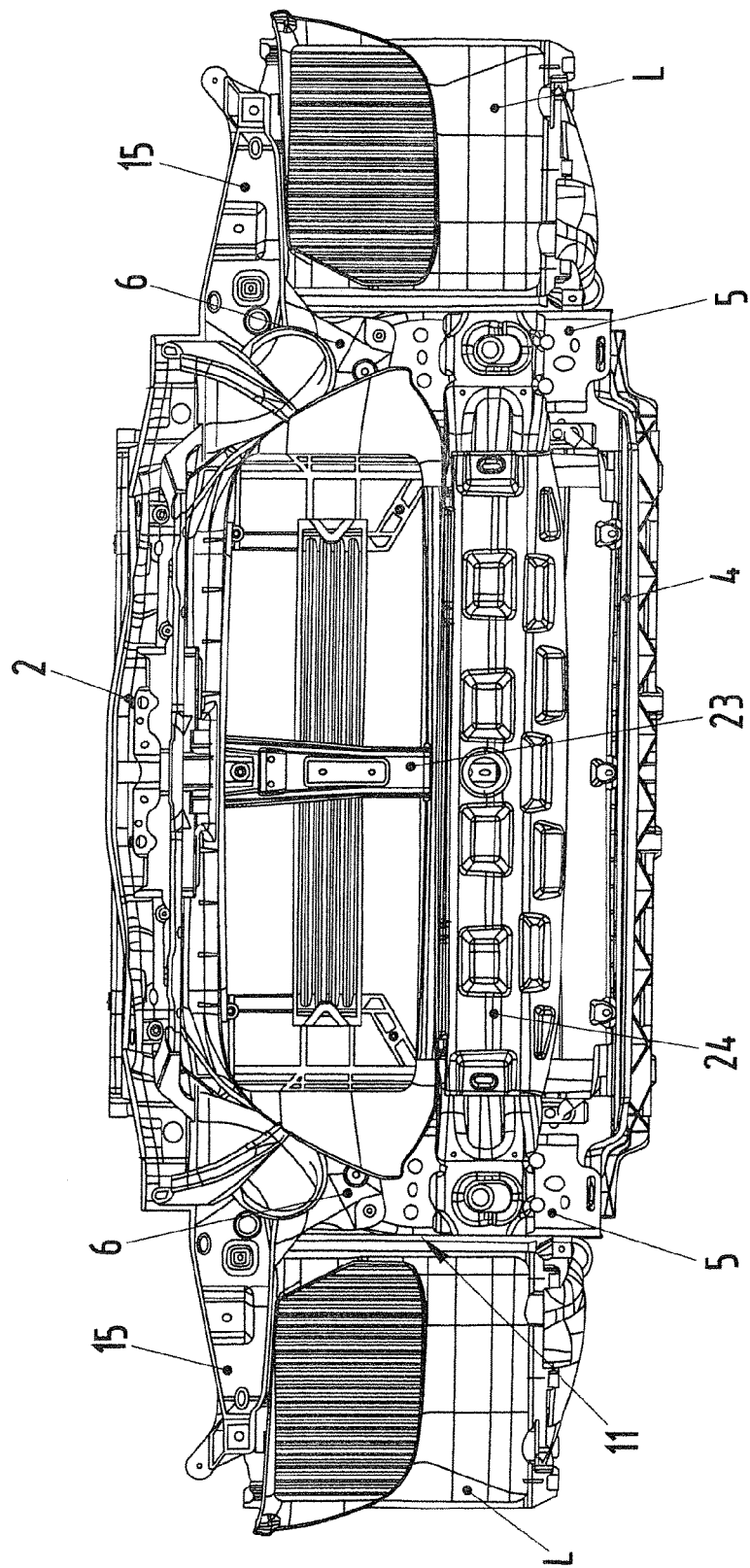
FIG. 5 is a front, elevational view of the front end module.
Figure 6:
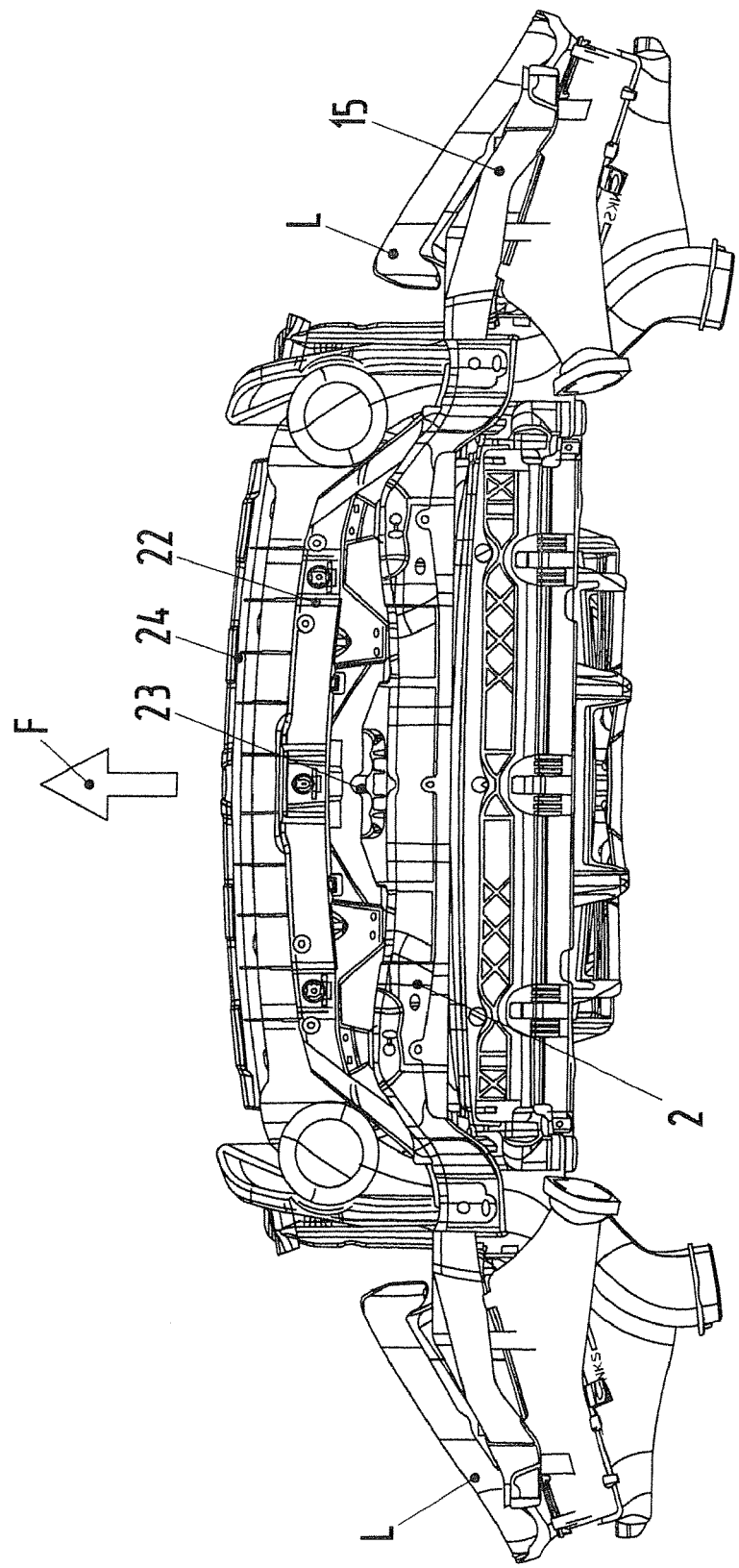
FIG. 6 is a top, plan view of the front end module.
Figure 7:
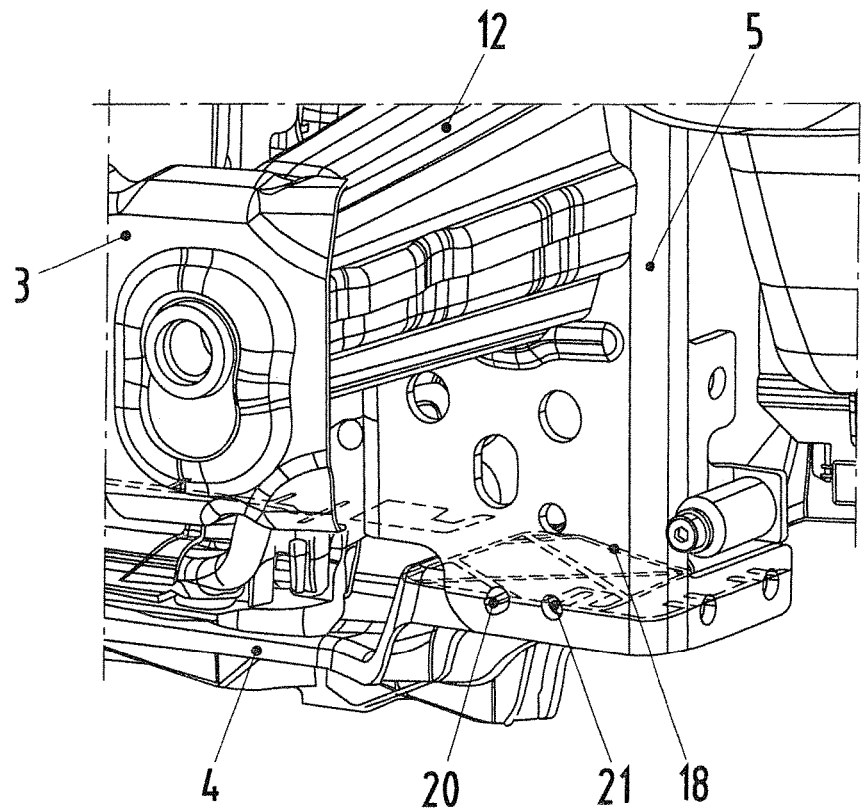
FIG. 7 is a diagrammatic, perspective view of a graphic illustration of a connection of the lower crash cross member to the bulkhead plate of the upper crash cross member.
Figure 8:
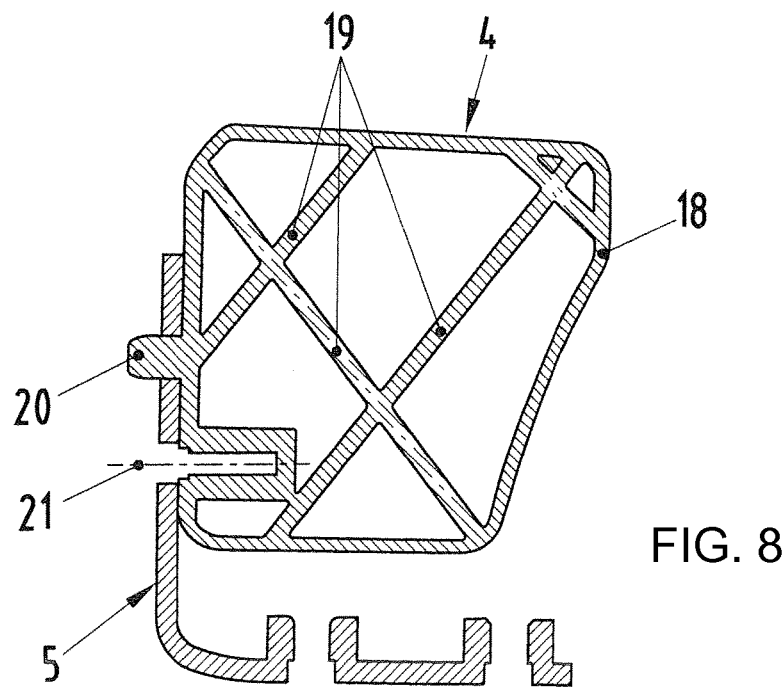
FIG. 8 is a top view of the connection according to FIG. 7.

The assembly support 2 of the front end module 1 of the motor vehicle accommodates a charge air cooler L between the lateral frame sections 11, which are formed by the bulkhead plates 5 and the connecting limbs 6 and a horizontal support part 15 led out via the connecting limb 6, the charge air cooler being fastenable in each case to the bulkhead plate 10 and to the support part 15 (FIG. 5).

Figure 3:
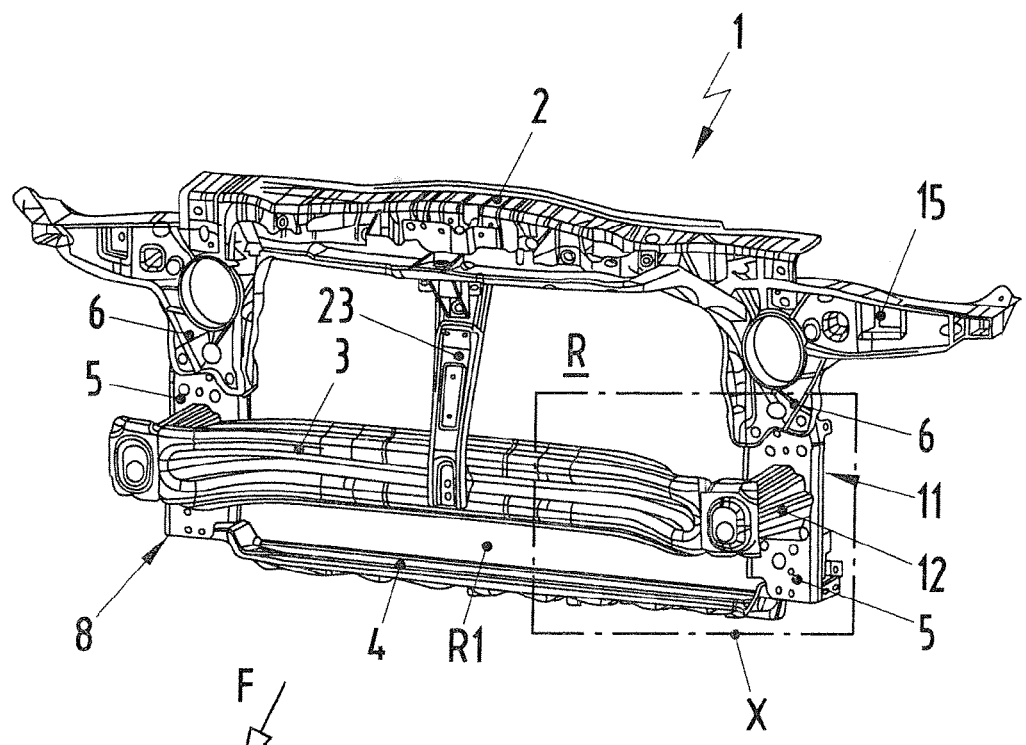
FIG. 3 is a diagrammatic, perspective view of the individual, assembled structural elements of the front end module.
Figure 4:
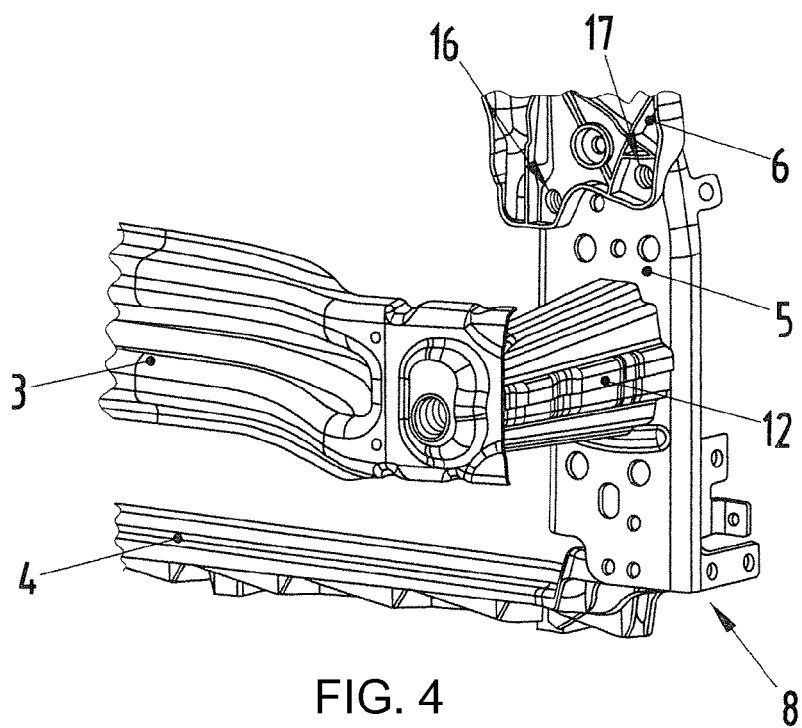
FIG. 4 is a diagrammatic, perspective view of a detail X of a connection of the bulkhead plate of the crash cross member to a connecting limb of the assembly support.

FIG. 4 illustrates the detail X in FIG. 3 on an enlarged scale. The bulkhead plate 5 is held from the rear—with respect to the direction of travel F—by the connecting limb 6 of the assembly support 2 via two fastening screws 16 and 17.

The lower crash cross-member 4, at the free end, has a respective plate-shaped foot 18 with an inner ribbing 19 which is fixable in the bulkhead plate 5 by a guide pin 20 and is connectable to the bulkhead plate 5 via a fastening screw 21 (illustrated symbolically as a dash-dotted line).

The front end module 1 contains, in a manner oriented transversely on the front side, a supporting frame 22 to which a non-illustrated covering front part is fastenable. A lock strut 23 which is arranged in the longitudinal center plane of the vehicle and is made of steel is arranged between the supporting frame 22 and the assembly support 2 and is fastened by an upper end to the assembly support 2. The lock strut 23 is held by its lower, free end on the upper crash cross-member 3. A crash foam part 24 is arranged on the front side of the latter.

The invention claimed is:

1. A front end module for a motor vehicle and connected to a vehicle body, the front end module comprising:
   an assembly support disposed above longitudinal members of the vehicle body and having connecting limbs;
   fasteners;
   an upper crash cross-member connected to the longitudinal members, said assembly support connected to said upper crash cross-member and forms a rectangular closed frame, and for connection to said assembly support, said upper crash cross-member having vertically aligned bulkhead plates disposed in each case on an end side, and are connected to said connecting limbs of said assembly support via said fasteners, said connecting limbs together with said bulkhead plates form lateral frame sections, said vertically aligned bulkhead plates extending below said connecting limbs, said vertically aligned bulkhead plates directly connected to the longitudinal members; and
   a lower crash cross-member fastened at a distance to lower, free ends of said bulkhead plates of said upper crash cross-member, and said upper and lower crash cross-members form a further, rectangularly closed frame.

2. The front end module according to claim 1, further comprising crash boxes, said upper crash cross-member is connected in each case at a free, lateral end to one of said crash boxes which, on a end side, has said bulkhead plate, at a rear end, with respect to a direction of travel.

3. The front end module according to claim 1, wherein:
   said assembly support is configured as a hybrid component and contains a steel upper chord encapsulated by plastic by injection molding; and
   said connecting limbs are composed of a plastic material.

4. The front end module according to claim 1, wherein a front side of said upper crash cross-member has a transversely oriented crash foam part.

5. The front end module according to claim 1,
   wherein said assembly support has a horizontal support part leading out from said connecting limbs; and
   further comprising a charge air cooler disposed on said assembly support between said lateral frame sections and said horizontal support part, said charge air cooler being held on at least one of said bulkhead plate of said upper crash cross-member and on said horizontal support part.

6. The front end module according to claim 1, wherein said upper crash cross-member is connectable via said bulkhead plates on said end sides to said connecting limbs from a rear, with respect to a direction of travel F, via at least two of said fasteners being fastening screws.

7. The front end module according to claim 1, further comprising:
   a supporting frame disposed on a front side of said assembly support; and
   a vertically oriented lock strut disposed between said supporting frame and said assembly support, said vertically oriented lock strut disposed in a longitudinal center plane of the motor vehicle and fastened to said assembly support, said vertically oriented lock strut having a lower, free end connected to said upper crash cross-member.

8. A front end module for a motor vehicle and connected to a vehicle body, the front end module comprising:

an assembly support disposed above longitudinal members of the vehicle body and having connecting limbs;

fasteners;

an upper crash cross-member connected to the longitudinal members, said assembly support connected to said upper crash cross-member and forms a rectangular closed frame, and for connection to said assembly support, said upper crash cross-member having vertically aligned bulkhead plates disposed in each case on an end side, and are connected to said connecting limbs of said assembly support via said fasteners, said connecting limbs together with said bulkhead plates form lateral frame sections;

a lower crash cross-member fastened at a distance to lower, free ends of said bulkhead plates of said upper crash cross-member, and said upper and lower crash cross-members form a further, rectangularly closed frame;

at least one fastening screw and a guide pin;

said lower crash cross-member containing free ends each having a respective plate-like foot with an inner ribbing and is fixed in said bulkhead plate via said guide pin and is fastenable to said bulkhead plate by means of said at least one fastening screw.

* * * * *